UNITED STATES PATENT OFFICE.

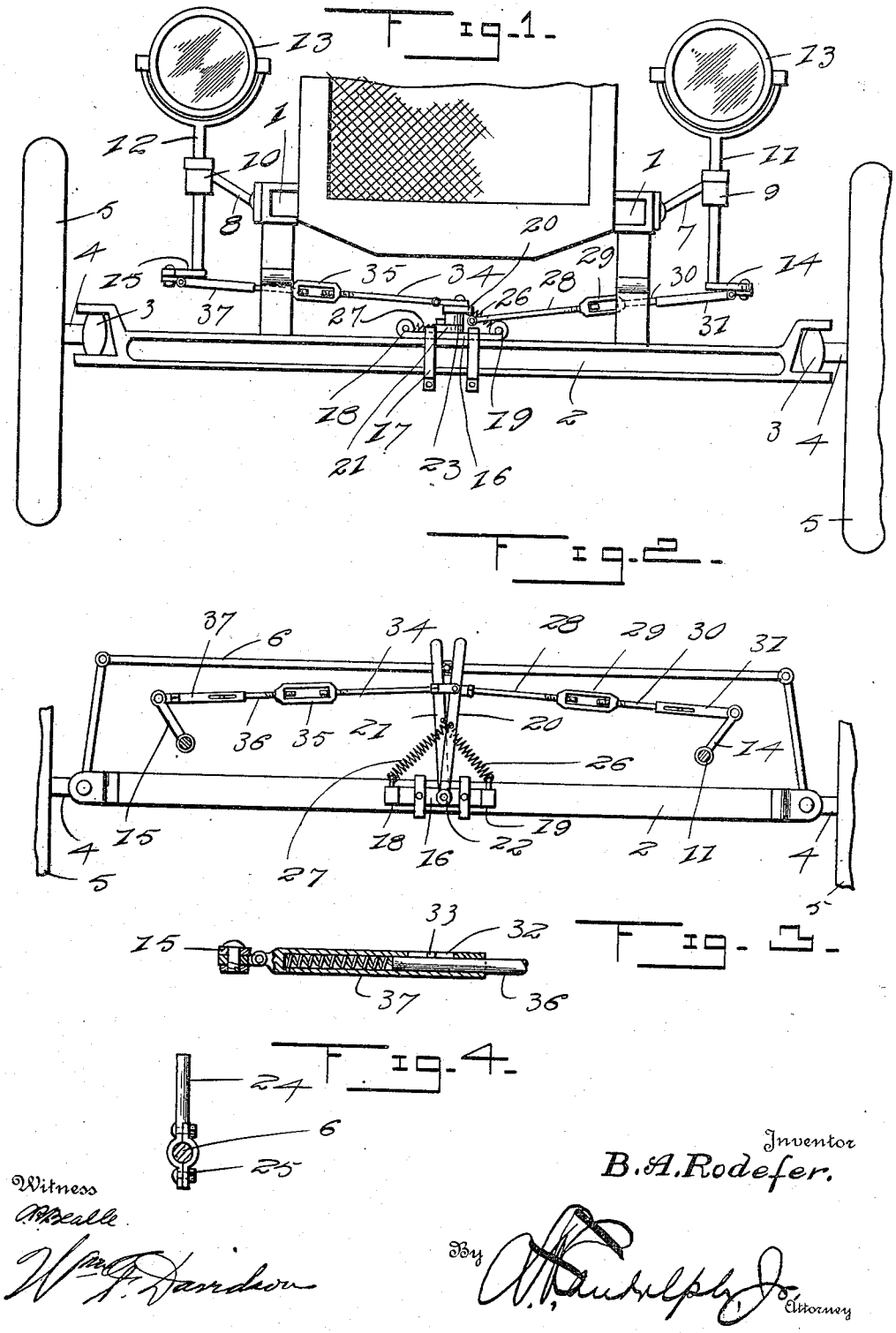

BERT A. RODEFER, OF ASTORIA, OREGON, ASSIGNOR OF ONE-HALF TO JESSE W. MURPHY, OF ASTORIA, OREGON.

DIRIGIBLE AUTOMATIC HEADLIGHT.

1,222,141.  Specification of Letters Patent.  Patented Apr. 10, 1917.

Application filed July 14, 1916. Serial No. 109,321.

*To all whom it may concern:*

Be it known that I, BERT A. RODEFER, a citizen of the United States, residing at Astoria, in the county of Clatsop and State of Oregon, have invented certain new and useful Improvements in Dirigible Automatic Headlights; and I do hereby declare the following to be a full, clear, and exact description of the invention, such as will enable others skilled in the art to which it appertains to make and use the same.

This invention relates to new and useful improvements in an automatic dirigible headlight and one of its objects is the provision of a device of this character, which shall be simple, durable and efficient, and which may be manufactured and sold at a comparatively low cost.

Another object of this invention is to provide a pair of arms pivoted to the front axles of an automobile and connected to the headlights and have positioned therebetween an arm carried by the connecting rod of the steering mechanism, whereby upon movement of the connecting rod in either direction to turn the front wheels of the automobile, one or the other of the lights will be turned in a corresponding direction to illuminate the path of the turn of the automobile, while the other headlight remains stationary and illuminates the path straight ahead of the automobile.

A further object of this invention is to provide means for returning either of the headlights to their normal position after they have been once turned to illuminate a curve in the route of the automobile, after the front wheels have been turned back to a straight path.

A still further object of this invention is to provide a connection between the arm and the headlights which will allow for slight movement of the steering mechanism without moving or turning the headlights, obviating vibration or short turning of the headlights caused by the front wheels passing over uneven ground.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawing, in which:—

Figure 1 is a front elevation of a dirigible automatic headlight, constructed in accordance with my invention, Fig. 2 is a top plan view of the same, Fig. 3 is a detail sectional view illustrating the means for allowing a slight movement of the arms without turning the headlights, and Fig. 4 is a detail sectional view of the arm carried by the connecting rod of the automobile.

Referring in detail to the drawing, the numeral 1 indicates a chassis of an automobile mounted upon a front axle 2, which has secured at each end the usual steering knuckles 3. Formed on the steering knuckles 3 are spindles 4 on which are journaled the front wheels 5. The steering knuckles 3 are connected together by a connecting rod 6. The foregoing description relates to an automobile of a well known construction and to which my invention is applied.

Secured to the forward end of the chassis 1 are lamp supporting brackets 7 and 8 having formed thereon bearings 9 and 10 in which are journaled lamp standards 11 and 12. The lamp standards have their upper ends forked to receive headlights 13, which may be of any desired construction. Secured to the lower ends of the lamp standards 11 and 12 are crank arms 14 and 15 for turning the lamp standards 11 and 12 within the bearings 9 and 10, by means which will be hereinafter more fully described.

A plate 16 is secured upon the upper face of the front axle 2 intermediate its ends by clamps 17 and has each end bent to form eyes 18 and 19. A pair of arms 20 and 21 are pivotally secured to the plate 16 as illustrated at 22 and the arms are spaced apart by a collar 23 as clearly illustrated in Fig. 1. The arms 20 and 21 extend rearwardly and overlie the connecting rod 6. An arm 24 is detachably secured to the connecting rod 6 by a clamp 25 and extends vertically of the arms 20 and 21 and is interposed therebetween as clearly illustrated in Fig. 2. A pair of coil springs 26 and 27 are secured to the eyes 18 and 19 and have their other ends secured to the arms 20 and 21 for normally retaining the arms into engagement with the vertical arm 24. A rod 28 is pivotally secured to the arm 21 and in turn connected to a turn buckle 29. A rod 30 is connected to the turn buckle 29 and is received within a casing 31 which is in turn pivoted to the crank arm 14 of the lamp standard 11. The member 31 is provided with an elongated slot 32 to receive a lug 33 on the rod 30 for allowing the member 31 to have a slight movement in relation to the rod 30. A coil spring is positioned within the member 31 and bears against the end of the rod 30 to absorb all shocks and jars of the arm 21 received from the connecting rod 6, to prevent vibration to the headlights 13. A rod 34 is pivoted to the arm 20 and is in turn connected to a turn buckle 35 which has connected thereto a rod 36 which is received within a cylindrical member 37 identical in construction with the cylindrical member 31 and is pivotally connected to the crank arm 15 of the lamp standard 12. The rod 36 is provided with a lug similar to the lug 33 upon the rod 30 and is received within an elongated slot of the cylindrical member 37 as clearly illustrated in Fig. 2. A coil spring similar to the one positioned within the cylindrical member 31 is interposed between the end of the rod 36 and the cylindrical member 37 for absorbing shocks and vibrations received from the arm 20, caused by the connecting rod 6, obviating vibrations to the lamp standard 12.

In operation, when the connecting rod 6 is moved to the right to turn the front wheels 5 to the left, the arm 21 is moved in a corresponding direction with the connecting rod 6 by the vertical arm 24, causing the lamp standard 11 to be rotated to turn the headlights 13 thereon in the direction of the turn being made by the automobile, allowing the other headlight upon the lamp standard 12 to remain stationary. When the connecting rod 6 is moved to the left to turn the front wheels to the right, the arm 20 is moved in a corresponding direction to turn the lamp standard 12 and headlight thereon in the corresponding direction with the front wheels 5. When the front wheels have been returned to their normal position, the springs 27 and 26 will return the arms 20 and 21 to their normal position to turn the headlights to their normal position.

While I have shown and described the preferred embodiment of my invention, it will be understood that minor changes in construction, combination and arrangement of parts may be made without departing from the spirit and scope of the invention as claimed.

Having thus described my invention, what I claim is:—

1. In combination, an automobile including a chassis having a front axle and a connecting rod, of a pair of lamp standards rotatably mounted on the chassis, a plate secured to the axle, a pair of arms pivotally secured to the plate and overlying the connecting rod, means carried by the connecting rod for an engagement with the arms, and means for connecting the arms with the lamp standards to turn the lamp standards.

2. In combination, an automobile including a chassis having a front axle and a connecting rod, of a pair of lamp standards journaled to the chassis, headlights carried by said lamp standards, a plate detachably secured to the front axle, a pair of arms pivoted to said plate and overlying the connecting rod, a vertical arm secured to the connecting rod and positioned between said arm, and means for connecting the arm with the lamp standard to turn the headlights.

3. In combination, an automobile including a chassis having a front axle and a connecting rod, of a pair of lamp standards journaled to the chassis, headlights carried by said lamp standards, crank arms carried by the lamp standards, a plate detachably secured to the axle, a pair of arms pivoted to the plate and overlying the connecting rod, means for connecting the connecting rod with the arms, means for connecting the arms with the crank arms of the lamp standards to turn the headlights, and means connected to the arms and to the plate for returning said arms to their normal position.

4. In combination, an automobile including a chassis having a front axle and a connecting rod, of a pair of lamp standards journaled to the chassis, headlights carried by the lamp standards, a plate detachably secured to the front axle and having its ends bent to form eyes, a pair of arms pivoted to said plate and overlying the connecting rod, a vertical arm carried by the connecting rod and positioned between the arms, springs connected to the eyes and to the arms for holding said arms into engagement with the vertical arm, and means for connecting the arms with the lamp standard to turn the headlights.

5. In combination, an automobile including a chassis having a front axle and a connecting rod, of a pair of lamp standards journaled to the chassis, headlights carried by said lamp standards, a pair of arms pivoted to the front axle and overlying the connecting rod, means for connecting the arms with the connecting rod, means for holding the arms in their normal position, adjustable rods pivoted to said arms, crank arms carried by the lamp standards, cylindrical members carried by the crank arms to receive the adjustable arms, and coil springs positioned within the cylindrical members and bearing against the adjustable rods to prevent vibration of the lamp standards.

In testimony whereof I affix my signature in presence of two witnesses.

BERT A. RODEFER.

Witnesses:
J. J. BARRETT,
RALPH C. ZIMMERMAN.

Copies of this patent may be obtained for five cents each, by addressing the "Commissioner of Patents, Washington, D. C."